_(12)_ United States Patent
Brandel et al.

(10) Patent No.: US 7,722,103 B2
(45) Date of Patent: May 25, 2010

(54) CABRIOLET

(75) Inventors: Klaus Brandel, Wiesbaden (DE); Frank Leopold, Taunusstein-Orlen (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/090,800

(22) PCT Filed: Oct. 2, 2006

(86) PCT No.: PCT/EP2006/009538

§ 371 (c)(1),
(2), (4) Date: Apr. 18, 2008

(87) PCT Pub. No.: WO2007/045349

PCT Pub. Date: Apr. 26, 2007

(65) Prior Publication Data

US 2008/0265628 A1     Oct. 30, 2008

(30) Foreign Application Priority Data

Oct. 19, 2005   (DE) .................. 10 2005 049 933

(51) Int. Cl.
*B60J 7/14* (2006.01)
(52) U.S. Cl. ............... 296/26.02; 296/108; 296/220.01; 296/107.17
(58) Field of Classification Search ............ 296/216.01, 296/26.02, 219, 220.01, 216.02, 216.03, 296/107.17, 108
See application file for complete search history.

(56) References Cited

U.S. PATENT DOCUMENTS

| 4,712,827 | A | * | 12/1987 | Jensen ................. 296/99.1 |
| 5,738,405 | A | * | 4/1998 | Richters et al. ....... 296/193.03 |

FOREIGN PATENT DOCUMENTS

| DE | 1111964 | * | 7/1961 | ............. 296/219 |
| DE | 3903358 | * | 8/1990 | |
| DE | 19616118 A1 | | 10/1997 | |
| DE | 29817132 U1 | | 2/2000 | |
| DE | 19952779 C1 | | 5/2001 | |
| DE | 10144001 A1 | | 4/2003 | |
| DE | 10345123 A1 | | 6/2005 | |
| DE | 102004020008 A1 | | 11/2005 | |
| FR | 638173 | * | 7/1927 | ............. 296/219 |
| JP | 2003063253 A | | 3/2003 | |

OTHER PUBLICATIONS

International Search Report for International Application No. PCT/EP2006/009538, mailed Mar. 15, 2007.

* cited by examiner

*Primary Examiner*—Dennis H Pedder
(74) *Attorney, Agent, or Firm*—Ingrassia Fisher & Lorenz, P.C.

(57) ABSTRACT

A cabriolet motor vehicle is provided, which comprises a roof constructed from at least two roof segments, which may be brought into an open position, rear roof columns stiffened by an upper roof cross member ("Targa part"), and a rollbar ("Targa bar") situated in the area between a front frame and the Targa part, and is distinguished in that the at least two roof segments are stackable using a movement mechanism into a roof segment stack situated between the Targa bar and the target part, and the roof segment stack is pivotable into the passenger compartment using at least one connecting rod attached to the upper roof cross member of the Targa part.

9 Claims, 7 Drawing Sheets

CABRIOLET

CROSS-REFERENCE TO RELATED APPLICATIONS

This application is a U.S. National-Stage entry under 35 U.S.C. § 371 based on International Application No. PCT/EP2006/009538, filed Oct. 2, 2006, which was published under PCT Article 21(2) and which claims priority to German Application No. 10 2005 049 933.3, filed Oct. 19, 2005, which are all hereby incorporated in their entirety by reference.

TECHNICAL FIELD

The present invention is in the field of motor vehicle technology and relates to a cabriolet motor vehicle.

BACKGROUND

In the automobile industry, motor vehicles for use predominantly as transport vehicles like a pickup have been constructed until now having an open cargo area, by which the usability of the cargo area is restricted during bad weather, however. In addition, pickups are unsuitable for use solely as passenger automobiles.

Furthermore, constructing small SUVs as passenger automobiles and as utility vehicles having a closed or open cargo area like a pickup is known. Such SUVs are provided with a removable hardtop or cover mechanisms similar to a cabriolet in combination with plug-ins or fixed elements to expose an open cargo area and simultaneously offer the possibility of a closed cargo area. However, the mounting of elements of this type has proven to be time-consuming and work-intensive in practice, because of which such vehicles are impractical for only occasional transport. Furthermore, up to this point there has been no screening of the cargo area from the passenger compartment, so that exhaust gases and cold outside air may reach the passenger compartment. In view of the foregoing, it is at least one object to provide an open motor vehicle (cabriolet) that may be used on one hand predominantly as a passenger automobile and on the other hand predominantly as a utility vehicle, in particular like a pickup having an open or closed cargo area. Furthermore, other objects, desirable features and characteristics of the present invention will become apparent from the subsequent summary detailed description and appended claims, taken in conjunction with the accompanying drawings and this background.

SUMMARY

In accordance with one embodiment, an open motor vehicle (cabriolet) is provided, which may be used on one hand predominantly as a passenger automobile and on the other hand predominantly as a utility vehicle, in particular like a pickup having an open or closed cargo area.

This object is achieved according to the suggestion of the present invention by a cabriolet motor vehicle having a roof constructed from at least two roof segments that may be brought into an open position; rear roof columns stiffened at least by an upper roof cross member; and a rollbar situated in the area between a front frame and the rear roof columns stiffened at least by the upper roof cross member, More specifically, and by way of example only, a cabriolet motor vehicle having an openable roof is disclosed according to an embodiment of the present invention, which is constructed from at least two segments, which may be brought into an open position. Furthermore, the motor vehicle comprises rear roof columns ("C columns") as part of the support structure of the vehicle body, which are stiffened by at least one upper roof cross member, which is referred to as a "Targa part". Moreover, a rollbar (also referred to as a "Targa bar"), which is supported on the vehicle body as part of the support structure, is situated in the area between a front frame of the front structure of the motor vehicle, which particularly encloses the windshield, and the Targa part.

The motor vehicle according to an embodiment of the present invention is essentially distinguished in that the at least two segments may be stacked using a movement mechanism into a roof segment stack situated between the Targa bar and the Targa part, for example, by pivoting and/or shifting, the roof segment stack being pivotable around at least one connecting rod, attached to the upper roof cross member of the Targa part, into the passenger compartment.

If the vehicle is equipped as a four-seater with rear seats, it is particularly preferable if the roof segment stack may be pivoted into a position located behind the rear seats. The roof segment stack may thus be stowed in a space-saving way, without having to make use of stowage space in the trunk, for example. By pivoting the roof segment stack behind the rear seats, a vehicle having a passenger compartment closed on all sides may be converted easily into an open passenger automobile having a "Targa" structure. To pivot the roof segment stack behind the rear seats, it is generally necessary to first push the rear seats forward and fold down the backrests forward. After completed pivoting of the roof segment stack, the rear seats may then be put back in their usage position. If the rear seats are no longer put into their usage position and possibly pressed as closely as possible against the front seats, however, which may be performed by folding up the seat surfaces and leaning the backrests against them, a vehicle having a 2-seat Targa structure with a cargo area open to the rear results.

According to another embodiment of the present invention, it is especially preferable if the Targa part is displaceable in the vehicle longitudinal direction in the area of the beltline of the motor vehicle. After the roof segments are stacked and the roof segment stack is pivoted into the passenger compartment, particularly into a position behind the rear seats, by shifting the Targa part in the vehicle longitudinal direction, a cargo area for transporting cargo like a pickup may be exposed. In this way, an initially closed vehicle or an open vehicle having a Targa structure may be easily converted into a cabriolet vehicle having an open cargo area like a pickup. In a 2-seat vehicle having a cargo area, a cargo area does not have to be produced before the Targa part is displaced. In a 4-seat vehicle without a cargo area, a cargo area must first be produced by appropriate positioning of the rear seats, which may advantageously be performed by pushing the rear seats forward, followed by folding up the seat surfaces and leaning the backrests against them. The rear seats are advantageously brought into a position as close as possible to the front seats for this purpose, to produce the largest possible cargo area.

In addition, the passenger compartment is advantageously closed to the rear by the Targa part and the roof segment stack, to prevent the undesired penetration of exhaust gases in this way.

Through the cabriolet motor vehicle according to an embodiment of the present invention, a vehicle predominantly used as a passenger automobile or a vehicle predominantly used as a utility vehicle like a pickup having a closed or open cargo area may thus be implemented easily, without having to accept the disadvantages of typical pickups or SUVs described in the background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
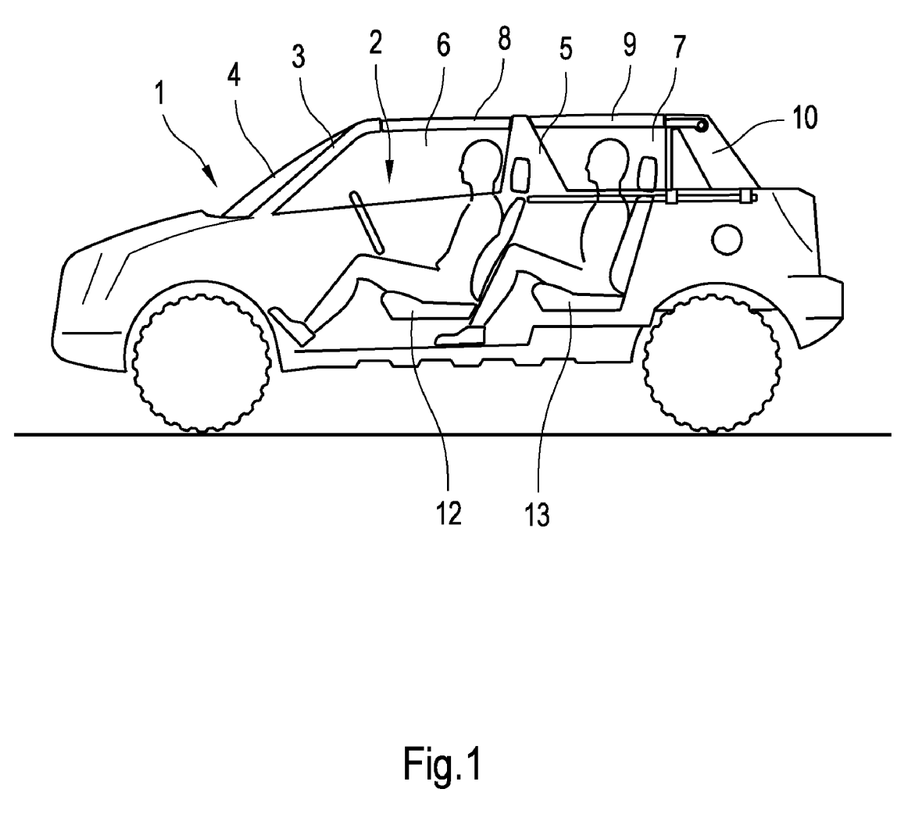
FIG. 1 shows a schematic sectional illustration of a cabriolet motor vehicle according to the present invention having closed passenger compartment.

Reference is first made to FIG. 1, in which a schematic sectional illustration of an exemplary embodiment of a motor vehicle according to the present invention having a closed passenger compartment is shown. Accordingly, a cabriolet motor vehicle, which is identified as a whole by the reference numeral 1, comprises a passenger compartment 2 having front seats 12 and rear seats 13.

The passenger compartment is delimited in a forward area above the beltline (curb) of the vehicle toward the side by the windshield 4 received in the front frame 3 and the two front side panes 6, which extend from the forward frame 3 up to a rollbar 5 ("Targa bar") situated in the area of the typical B columns. The rollbar 5 is supported on the vehicle body and is used as a part of the support structure of the body. The external surface of the rollbar 5 aligns with the contour of the body external skin. The passenger compartment 2 is delimited on top by a front roof segment 8, which extends from the front frame 3 to the rollbar 5.

In a rear area, the passenger compartment 2 is delimited above the beltline toward the side by the rear side panes 7, which extend from the rollbar 5 up to the rear roof columns (C columns) 10, and to the rear by a rear pane 14, as well as a rear flap 15. The rear pane 14 may be folded upward, while the rear flap 15 may be folded downward, to thus expose a rear opening of the passenger compartment. The passenger compartment 2 is delimited on top by the rear roof segment 9, which extends from the rollbar 5 up to an upper roof cross member 11, which stiffens the two rear roof columns 10 and runs in the vehicle transverse direction.

The vehicle roof is thus composed of the forward roof segment 8 and the rear roof segment 9, the forward roof segment 8 being able to be pivoted onto the rear roof segment 9 using at least one connecting rod.

Figure 2A:
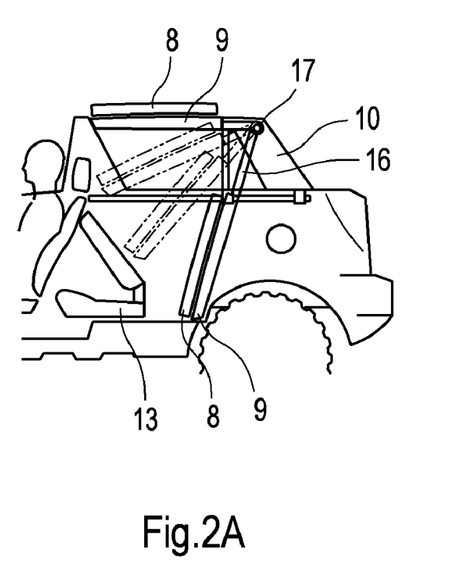
FIGS. 2A-2B show schematic sectional illustrations to illustrate the conversion of the motor vehicle from FIG. 1 into a vehicle having Targa structure with open passenger compartment without cargo area.
Figure 2B:
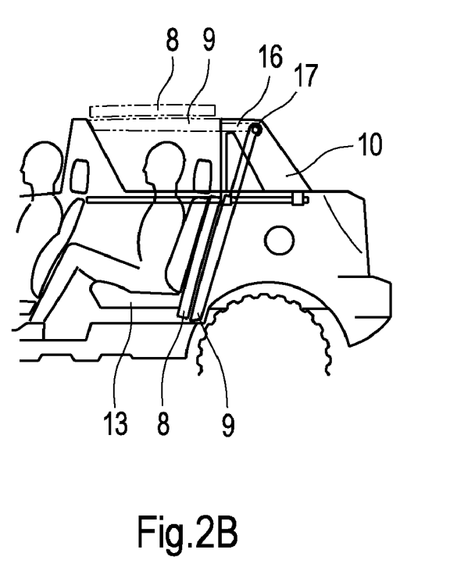
Figure 3:
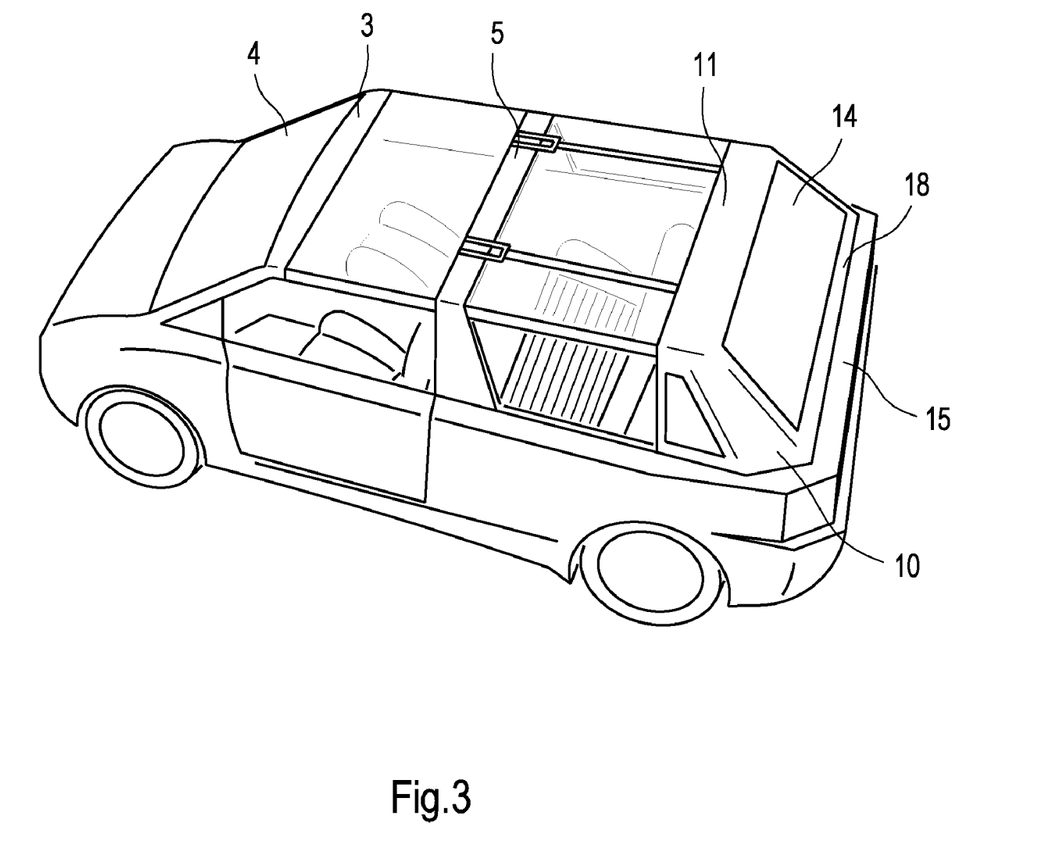
FIG. 3 shows a schematic perspective view of the vehicle having Targa structure with open passenger compartment without cargo area from above.

Reference is now made to FIGS. 2A, 2B, and 3, in which it is shown how the closed motor vehicle from FIG. 1 may be converted into an open passenger automobile without a cargo area (4-seat Targa structure). For this purpose, the front roof segment 8 is pivoted onto the rear roof segment 9 using a connecting rod situated between them, by which a roof segment stack results. The roof segment stack constructed from the two roof segments 8, 9 is subsequently pivoted using connecting rods 16, which are mounted so they are pivotable in a pivot bearing 17, into the passenger compartment 2 in a final position behind the two rear seats 13, the particular final positions and various intermediate positions of the roof segment stack being shown in FIGS. 2A and 2B. To allow pivoting of the roof segment stack into the passenger compartment 2, the two rear seats 13 must first be pushed forward and their backrests folded down forward, as shown in FIG. 2A. After the roof segment stack has been brought into its final position behind the two rear seats 13, the rear seats may be brought back into their usage position, as shown in FIG. 2B. The Targa structure of the vehicle having open roof without cargo area to be used predominantly as a passenger automobile is shown in the perspective illustration of FIG. 3 in particular. Furthermore, FIG. 3 shows that the two rear roof columns 10 are also stiffened by a lower cross member 18 extending in the vehicle transverse direction. The two rear roof columns 10, upper cross member 11, and lower cross member 18 jointly form a "Targa part".

If the two rear seats 13 are no longer brought into their usage position, a vehicle having a 2-seat Targa structure with a cargo area open on top thus arises. Such a situation is shown in FIG. 4.

Reference is now made to FIGS. 5A, 5B, 6, and 7 in which it is shown how the open motor vehicle having Targa structure from FIG. 3 may be converted into an open vehicle, predominantly used as a utility vehicle, having an open cargo area like a pickup. For this purpose, a situation is assumed as shown in FIG. 2A, namely having rear seats 13 pushed forward, whose backrests are laid down forward, to be able to pivot the roof segment stack comprising the two roof segments 8, 9 into the passenger compartment 2 which the aid of the connecting rods 16. After the completed pivoting of the roof segment stack into a position behind the rear seats 13 brought into the usage position, the rear seats 13 are not put back into their usage position, but rather the seat parts of the rear seats 13 are folded up in the vertical direction and moved with the backrests pressing against them until they are in contact with the rear side of the front seats 12, so that a cargo area results.

Figure 4:
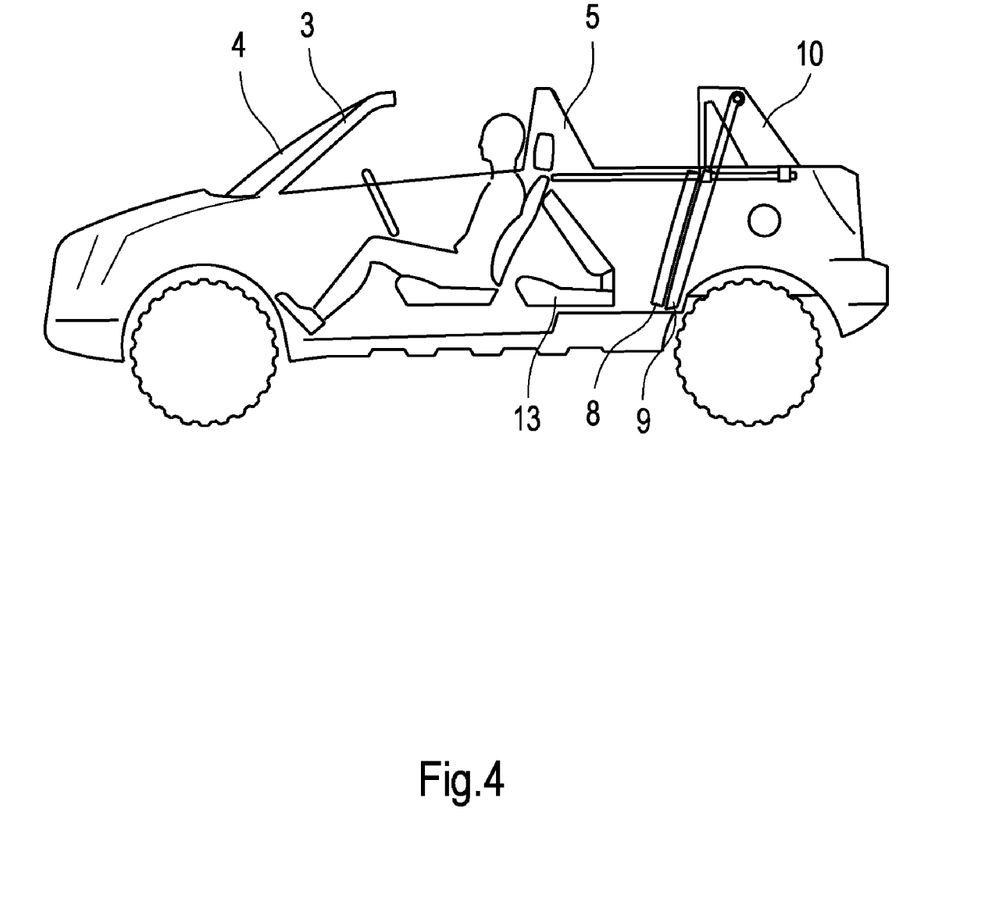
FIG. 4 shows a schematic sectional illustration of the vehicle having Targa structure with open passenger compartment and cargo area accessible from above.
Figure 5A:
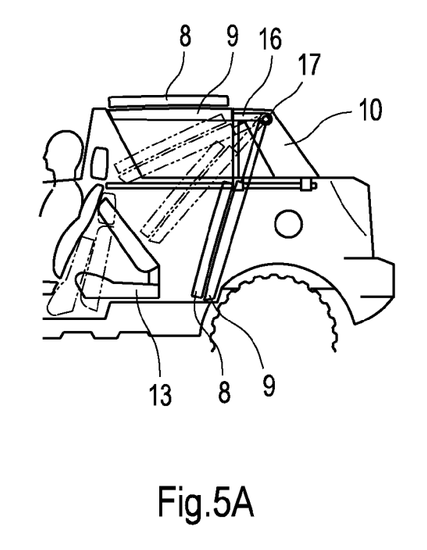
FIGS. 5A-5B show schematic sectional illustrations to illustrate the conversion of the motor vehicle from FIG. 1 into a vehicle having open passenger compartment and having pickup cargo area.
Figure 5B:
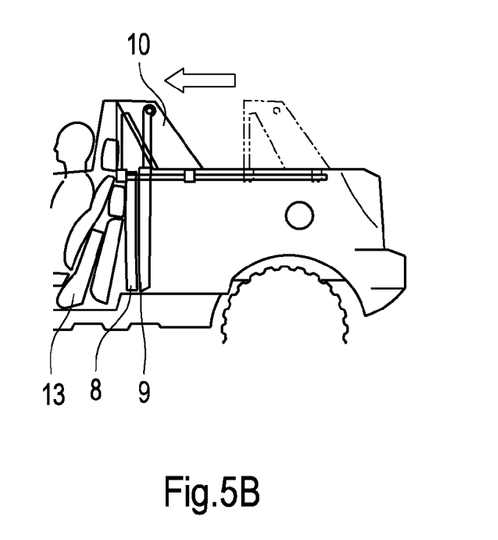
Figure 6:
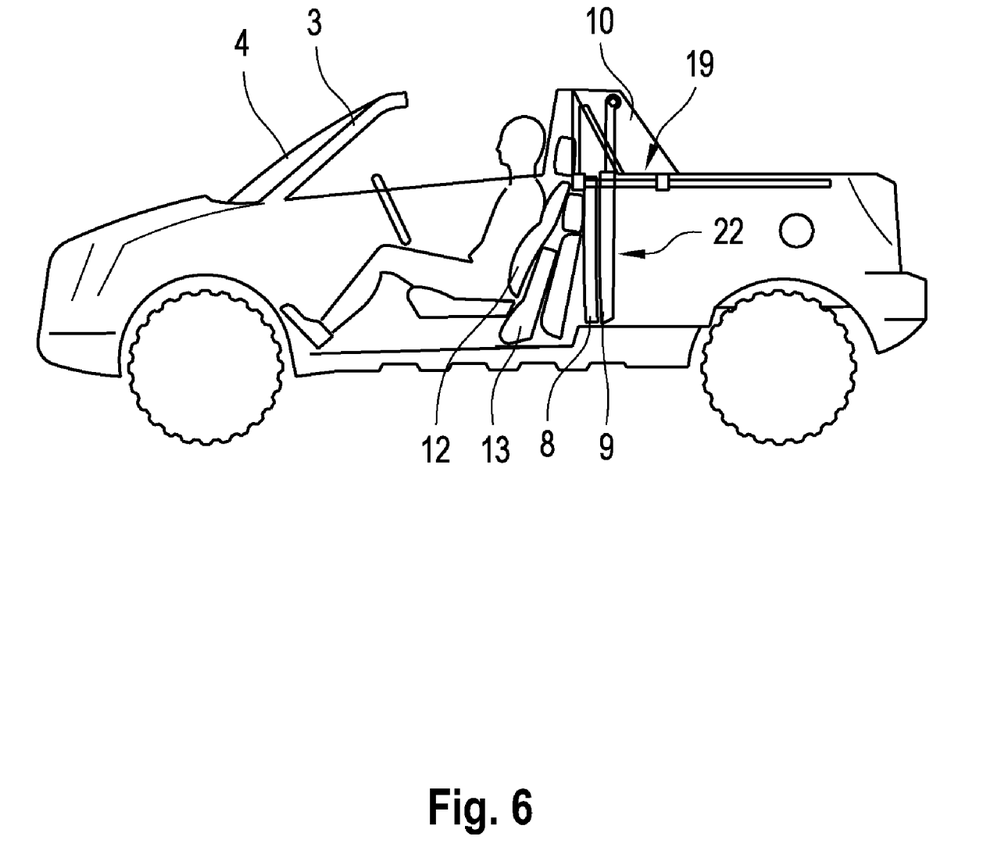
FIG. 6 shows a schematic sectional illustration of the open motor vehicle having pickup cargo area.
Figure 7:
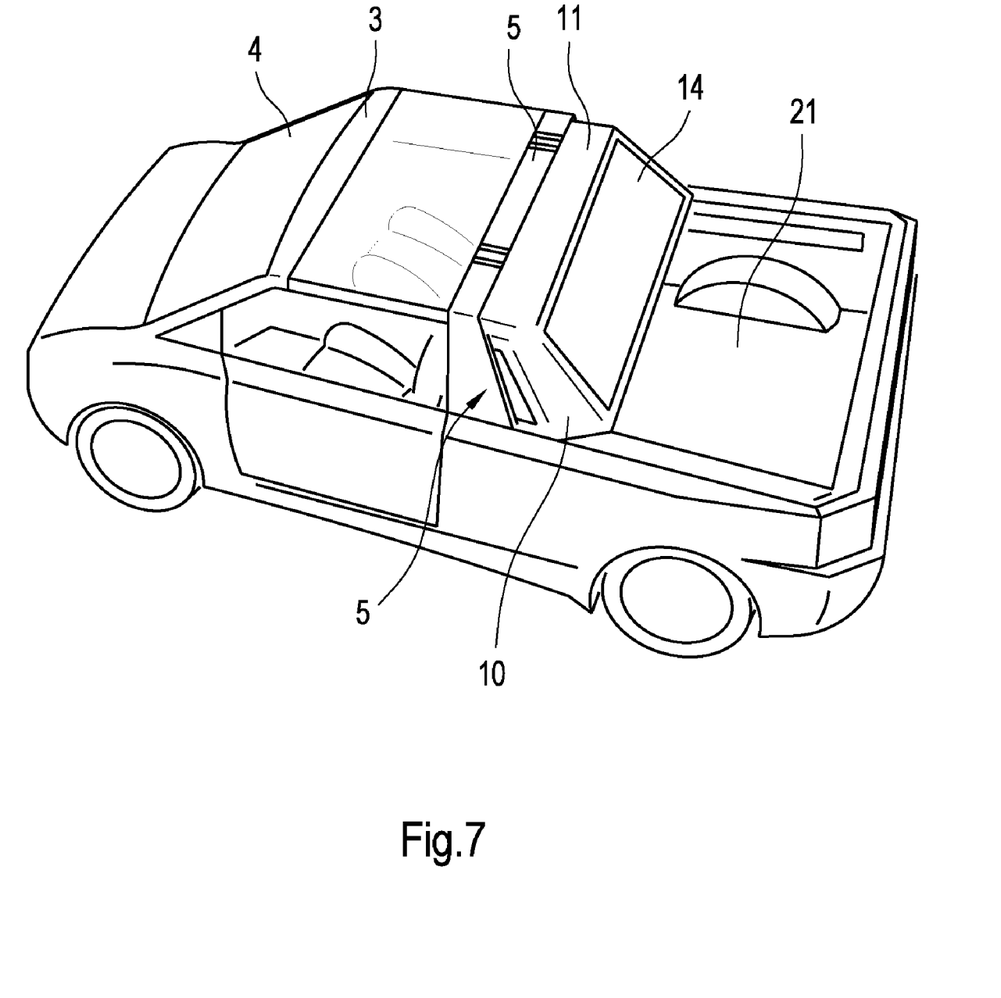
FIG. 7 shows a schematic perspective view of the motor vehicle from FIG. 6 from above.

As shown in FIG. 4B, the rear roof columns 10 and thus the complete Targa part having linked roof segment stack are subsequently shifted using a displacement mechanism at the height of the beltline in the vehicle longitudinal direction until the Targa part is shifted below the rollbar 5 and a final position is reached, by which the cargo area 21 is exposed. The final position achieved is shown in both FIGS. 4 and 5. In the final position, the Targa part having the rollbar 5 forms a seal line (not shown in greater detail) for sealing the 2-seat passenger compartment now remaining to the rear. A seal line in the rear shelf 19 shown in FIG. 4, and a seal line in the side wall 22 are used for the same purpose. In this way, the passenger compartment may be sealed to the rear, by which the undesired entrance of exhaust gases into the passenger compartment may be advantageously avoided. Guide rails 20, which are operationally linked to guide slides molded into the rear roof columns 10, to thus displace the Targa part, are provided at the height of the beltline of the vehicle for displacing the rear roof columns. The Targa part is preferably displaced automatically in this case, for example, driven by an electric motor advantageously powered by the vehicle electrical system. For the sake of completeness, it is also noted that the rear side panes 7 are lowered to expose the cargo area 21.

As shown in the exemplary embodiments illustrated, according to the present invention, a motor vehicle may be implemented as a 4-seat, closed passenger automobile ("station wagon"), which is predominantly used for passenger conveyance, as a 4-seat or 2-seat passenger/utility vehicle having Targa structure, which is used for passenger/cargo conveyance, and as a 2-seat utility motor vehicle having closed or open pickup cargo area predominantly for cargo conveyance. It is easily possible to convert the vehicle between the usage forms which may be implemented by stacking the roof segments and pivoting the roof segment stack into the passenger compartment by connecting rods on the Targa part, and possibly by situating the rear seats appropriately to produce a cargo area.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A cabriolet motor vehicle, comprising:
    a roof constructed from at least two roof segments that may be brought into an open position;
    a plurality of rear roof columns stiffened at least by an upper roof cross member; and
    a rollbar situated in the area between a front frame and the rear roof columns stiffened at east by the upper roof cross member, wherein:
        the at least two segments are stackable into a roof segment stack situated between the roll bar and the plurality of rear roof columns stiffened at least by the upper roof cross member using a movement mechanism,
        the roof segment stack is pivotable into a passenger compartment using at least one connecting rod attached to the upper roof cross member of the plurality of rear roof columns stiffened at least by the upper roof cross member, and
        the roof segment stack and the plurality of rear roof columns stiffened at least by the upper roof cross member terminate the passenger compartment to the rear.

2. The motor vehicle according to claim 1, wherein the motor vehicle is a 4-seat vehicle having front and rear seats, and the roof segment stack is pivotable into a position located behind the rear seats.

3. The motor vehicle according to claim 1, wherein the rear roof columns stiffened at least by the upper roof cross member is displaceable in a vehicle longitudinal direction in an area of beltline of the motor vehicle.

4. The motor vehicle according to claim 3, wherein pickup cargo area which is open on top is exposed by displacing the rear roof columns stiffened at least by the upper roof cross member in the vehicle longitudinal direction.

5. The motor vehicle according to claim 1, wherein the rear roof columns stiffened at least by the upper roof cross member is displaceable into a position pressing against the roll bar.

6. The motor vehicle according to claim 1, wherein the roof segments are pivotable toward one another using connecting rods.

7. The motor vehicle according to claim 1, wherein a front roof segment situated between the front frame and the roll bar and a rear roof segment situated between the roll bar and the rear roof columns stiffened at least by the upper roof cross member are provided, the front roof segment being pivotable onto the rear roof segment.

8. The motor vehicle according to claim 1, wherein the motor vehicle is a 2-seat vehicle having front seats, and the roof segment stack is pivotable into a position located behind the front seats.

9. The motor vehicle according to claim 8, wherein:
    a pickup cargo area which is open on top is exposed by displacing the rear roof columns stiffened at least by the upper roof cross member in the vehicle longitudinal direction, and
    the position of the roof segment stack is located between the front seats and the pickup cargo area.

* * * * *